Patented Aug. 23, 1949

2,479,930

UNITED STATES PATENT OFFICE 2,479,930

RECOVERY OF PRECIOUS METAL VALUES BY CYANIDATION

Earl C. Herkenhoff and Norman Hedley, Stamford, Conn., assignors to American Cyanamid Company, New York, N. Y., a corporation of Maine No Drawing. Application August 10, 1946,
Serial No. 689,809

6 Claims. (Cl. 75—106)

This invention relates to an improved process for recovering precious metals by cyanidation, and more particularly to the treatment of very slimy gold ores.

Cyanidation is one of the most important ore dressing methods used in the recovery of precious metals, such as gold and silver, from ores containing them. In the ordinary cyanidation process the finely divided ore is treated with a solution of cyanide, such as sodium or calcium cyanide, in the presence of lime and oxygen to dissolve the precious metals in the form of their soluble double cyanides. The solution thus obtained, which is known as the pregnant solution, is then filtered from the ore pulp and the precious metals precipitated by the use of finely divided zinc, followed by a second filtration. The zinc precipitation method has been developed to a very high state of metallurgical efficiency. In fact, it is so efficient that it will precipitate almost 100% of the dissolved precious metal cyanides.

The standard cyanidation process using zinc as a precipitant requires as an essential step a filtration or continuous counter-current decantation washing of the pregnant solution from the ore pulp. These steps constitute limiting factors on the type of ore. Low grade precious metal ores which may contain extremely small amounts of gold must be treated economically or the precious metal values will not repay the cost of treatment. Therefore, low grade slimy ores, such as for example, the so-called saprolites, have not been considered hitherto economically treatable by the ordinary cyanidation procedure using zinc precipitation, because the sticky slimes of these ores impose such a load on the filters that the filtration step cannot be carried out economically. Theoretically the continuous counter-current decantation method of treatment may be applied to slimy ores but ordinarily requires a very high capital outlay for many units of equipment, and even then must sometimes be followed by some method of filtering in order to recover gold in solution.

Various attempts have been made to render the low grade precious metal ores amenable to cyanidation. Of these attempts the only one which has been at all successful uses activated carbon as a precipitant and then removes the activated carbon from the ore pulp with the precipitated precious metal values in the pores of the carbon. The carbon can be used for precipitation without first filtering the ore pulp to produce a clear solution, which is required in the zinc process. However, the activated carbon precipitation process, while it has opened up some types of ore to cyanidation which was hitherto untreatable by the zinc precipitation process, is by no means ideal and has serious drawbacks. These drawbacks arise largely from the method which has hitherto been used in removing the precious metal bearing carbon from the ore pulp. The process employed involves froth flotation in the presence of a collector for carbon, such as hydrocarbon oils. It is possible to obtain a reasonably high recovery of precious metal by this method, but usually at a very serious sacrifice in grade of the flotation concentrate due to contamination with readily-floatable gangue slime and, in some cases, with barren sulfides. It should be remembered that this flotation concentrate must then be dewatered, which is made difficult by the high slime content, and then processed, usually by pyrometallurgical methods, in order to recover the precious metals. A fairly high grade of concentrate is necessary in order to keep costs and losses down. Unfortunately, the carbon precipitation process followed by flotation results in a low grade of concentrate and quite often the recovery of the loaded carbon is not complete, resulting in high residue losses. Another serious drawback lies in the fact that flotation requires a small size of carbon particle. As a result, the concentrate contains relatively finely divided carbon which, in pyrometallurgical processes, increases the mechanical dust loss when the carbon is smelted. Still another objection is that the collectors employed for flotation of the carbon tend to greatly reduce the activity of the carbon and make it unfit for further precipitation if cycling or counter-current flow of the carbon is employed.

In spite of the above drawbacks cyanidation processes using activated carbon as the precipitant represent an important advance in the treatment of certain precious metal ores or fractions thereof. They are, however, compromises, leaving much to be desired, and of course the drawbacks of the process, which are reflected in higher costs, correspondingly restrict the field of applicability of the process. Certain slimy low-grade ores cannot be economically treated even with ordinary activated carbon precipitation methods.

The present invention constitutes an improvement in the activated carbon precipitation process which removes the major drawbacks, permitting metallurgy which, under favorable circumstances, is substantially as good as that obtained by zinc precipitation, and at the same time recovers a high grade product which can be effectively treated by ordinary metallurgical processes without excessive loss. Essentially, the present invention employs activated carbon in which sufficient magnetic material, such as finely divided iron, ferro-alloys, magnetite, or the like has been incorporated so that the carbon particles are sufficiently magnetic to permit recovery on ordinary magnetic separators.

The process of the present invention has many advantages over the known activated carbon precipitating processes in which recovery was effected by froth flotation. In the first place, the ratio of concentration is much higher, often producing 3¼ times as high a grade. Secondly, magnetic separation is one of the most positive, rapid and cheap recovery procedures, using contact equipment, and requiring a minimum of labor and power cost, and the treatment does not affect the activity of the carbon. A further advantage of the process of the present invention lies in the fact that it is not necessary to use such finely divided carbon. Magnetic separation is just as effective on large carbon particles as on those of flotation size. This introduces a further economy, since it is not necessary to crush and size the carbon carefully and dust losses from excessive amounts of fines are eliminated or greatly reduced. At the same time the use of larger carbon particles has been found to involve no corresponding decrease in efficiency of precipitation. Still another advantage is that the density of the carbon particles is increased and this tends to eliminate possible short circuiting of the carbon at the surface of the pulp and allows better mixing with the pulp.

The magnetic activated carbon of the present invention may be prepared by various means. For example, the activated carbon may be prepared and then treated with a finely divided magnetic solid such as fine magnetite, for example, magnetic concentrates, using a suitable binder to cause the magnetic particles to adhere to the carbon particles. Any binder which is not affected by the cyanidation procedure and does not interfere with precipitation may be used, and the present invention is in no sense limited to the use of any particular binder. Sodium silicate, however, is preferred, as it is one of the most effective binders, and at the same time very cheap. After the magnetic material has been incorporated in the activated carbon the product is normally dried at a temperature not greatly exceeding the boiling point of water, and reactivated by heating to the customary high temperature for a short period of time.

Another method of incorporating magnetic particles in the carbon is to impregnate the carbon with a solution of an iron salt, which is then treated with a reducing agent in order to reduce the salt to metallic iron.

A third method is to produce magnetic iron oxide in the carbon by decomposing an absorbed solution of a suitable iron salt with heat.

It is an advantage of the present invention that the process steps are quite flexible. Thus, for example, the magnetic carbon may be added either during the dissolution of the precious metals by the cyanide solution and after solution is complete. It is also possible to add the carbon in stages or to effect a counter-current flow, that is to say, the fresh carbon being added to the weakest part of the solution. This flexibility of procedure makes it possible to fit the improvements of the present invention into existing flowsheets or to adapt flowsheets to local conditions.

A magnetic recovery of the activated carbon containing the precipitated precious metals follows in general standard magnetic recovery procedures, and the common types of magnetic separators may be employed without any material change. The possibility of using standard equipment reduces materially the cost of this portion of the process.

The concentrate itself is of granular character and is very readily filtered or de-watered. This is a great advantage over the recovery of carbon by froth flotation. It may then be shipped directly to smelters or it may be burned and the small volume of residue cyanided or otherwise treated by known methods for handling such concentrates. The presence of the small amount of magnetic material does not interfere in any way with the recovery of precious metals from the concentrate.

Some low grade precious metal ores contain small amounts of magnetite or similar magnetic materials. These, of course, would be removed with the magnetic carbon concentrate and would result in reduction of grade of the latter. It is therefore desirable when an ore has any considerable content of magnetic material, to subject it to a preliminary magnetic separation to remove such material. The tailing from this preliminary magnetic separator is then treated by the process of the present invention, exactly as is the case with non-magnetic ore.

The invention will be described in greater detail in conjunction with the following specific examples. Although in most of the examples technical grade of black calcium cyanide was used in accordance with standard cyanidation practice, the reagent consumptions are expressed as socium cyanide equivalents.

*Example 1*

A gold ore from California was used containing a higher proportion of refractory slimes, and assaying:

Gold _____ oz. Au/ton__ 0.23
Silver _____
Sulfur _____ % S__ 0.11
Iron _____ % Fe__ 6.86

The principal mineral constituents were quartz, sericite, iron oxides (including hematite, limonite and magnetite) dolomite and minor amounts of pyrite, chalcopyrite and arsenopyrite.

The ore was ground to a product having the following size-distribution:

| Mesh | Per Cent Wt. |
|---|---|
| +48 | 0.98 |
| +65 | 10.02 |
| +100 | 14.92 |
| +150 | 10.82 |
| +200 | 7.33 |
| +325 | 6.50 |
| −325 | 49.43 |
| Total | 100.00 |

Cyanidation was carried out by grinding the ore with hydrated lime to produce a saturated solution, adding technical calcium cyanide and agitating the pulp for 24 hours at 26% solids with the usual aeration. The pulp was filtered and washed on a laboratory filter to produce a clear, pregnant solution, which was then treated with a precipitant in the usual manner and assayed in order to obtain reference data for the ore. The ore is not amenable to filtration on an industrial basis, but of course any ore, no matter how slimy, can be filtered on a laboratory filter, given sufficient time. The results appear in the following table and represent approximately the maximum cyanidable gold in the ore.

| Product | Per Cent Wt. | Assay, Oz. Au/ton | Per Cent Distrib. of Au | Reagent Consumption, Lbs./Ton |
|---|---|---|---|---|
| Calc. Head | 100.00 | 0.226 | 100.00 | 0.82 NaCN. |
| Preg. and Wash Solution | 353.33 | 0.057 | 88.96 | 8.0 CaO. |
| Residue | 100.00 | 0.025 | 11.04 | |

A second portion of the same gold ore was likewise ground with lime, the ground pulp thickened and the naturally occurring magnetite, about 0.3% by weight, removed in a magnetic separator. The pulp was then cyanided with technical calcium cyanide at a density of 47%, additional lime being added and the cyanidation continued for 24 hours under optimum aeration conditions.

At the end of 24 hours 9 lbs./ton of magnetic activated peach pit charcoal of −20 +48 mesh was added. The charcoal was prepared by treating the originally activated charcoal with finely ground magnetite and sodium silicate, followed by drying and reactivation, the proportions being as follows:

|  | Parts |
|---|---|
| −20 +48 mesh activated peach pit carbon | 25 |
| −20 mesh magnetite | 20 |
| 40° Bé sodium silicate | 18 |
| H₂O | 8 |

The product was dried at 110° C. and activated for 8 minutes at 1600° F.

The pulp was then agitated for a further 24 hours and additional calcium hydroxide was added to maintain alkalinity. Thereupon the pulp was subjected to magnetic separation and the magnetic concentrate cleaned once magnetically. The various products were then filtered in the laboratory, washed and assayed. The metallurgical results are as follows:

| Product | Per Cent Wt. | Assay, Oz. Au/Ton | Per Cent Distrib. of Au | Reagent Consumption, Lbs./Ton |
|---|---|---|---|---|
| Calc. Head | 100.00 | 0.227 | 100.00 | 0.66 NaCN. |
| Mag. Conc | 0.59 | 32.895 | 85.62 | 19.7 CaO. |
| Barren and Wash | 281.67 | 0.0027 | 3.35 | 9.0 Mag. C. |
| Residue | 100.00 | 0.025 | 11.03 | |

It will be apparent that the magnetic carbon process recovered all but a small portion of the gold that was dissolved by cyanide, and the reagent consumption was moderate, the cyanide consumption being slightly smaller. It is to be expected that counter-current flow of the carbon would greatly reduce the loss of soluble gold. The ore would not be regarded as economically treatable by cyanidation with zinc dust precipitation.

*Example 2*

A series of five tests were carried out with a low-grade gold ore from Nevada having the following composition:

| Gold | oz. Au/ton | 0.13—0.14 |
|---|---|---|
| Silver | | |
| Sulfur | % S | 0.08 |
| Iron | % Fe | 2.62 | and containing principally quartz, sericite, feldspar, kaolin, iron oxides and some ferromagnesian minerals. This ore is too slimy for economical cyanidation by ordinary means.

*Test 1.*—A test charge of the ore was ground to 16.5% +100 mesh, and 53.0% −200 mesh with hydrated lime and the product was thickened by decantation. The naturally occurring magnetite (less than 1.0% of the weight) was removed and the pulp was transferred to a wide-mouth agitating bottle. Additions were made of cyanide and lime and the pulp at 37% solids was agitated for a 24-hour period. Magnetic carbon, (the same preparation as used in Example 1) was then added in the amount of 6.7 lbs. per ton of feed and the pulp was agitated for an additional 24 hour period, after which the carbon was recovered magnetically and the pulp was filtered and washed. The results obtained were as follows:

| Product | Percent Wt. | Assay, Oz. Au/Ton | Percent Distrib. of Au | Reagent Consumption, Lb./Ton |
|---|---|---|---|---|
| Calc. Head | 100.00 | 0.142 | 100.00 | 0.83 NaCN. |
| Mag. Conc | 0.42 | 29.453 | 86.96 | 5.8 CaO. |
| Barren and Wash | 273.33 | 0.0013 | 2.50 | 6.7 Mag. C. |
| Residue | 100.00 | 0.015 | 10.54 | |

*Test 2.*—A test charge of ore was ground and was treated exactly as in Test 1. At a pulp density of 37% solids, additions of cyanide, lime and magnetic carbon (same as used in Example 1) were made and the pulp was agitated for a 24-hour period, dissolution and precipitation of the gold on the carbon taking place simultaneously. After 24-hours contact, the carbon was recovered magnetically and the pulp was filtered and washed. The results were as follows:

| Product | Per Cent Wt. | Assay, Oz. Au/Ton | Per Cent Distrib. of Au | Reagent Consumption, Lbs./Ton |
|---|---|---|---|---|
| Calc. Head | 100.00 | 0.140 | 100.00 | 0.30 NaCN. |
| Mag. Conc | 0.37 | 32.407 | 85.66 | |
| Barren and Wash | 254.17 | 0.0020 | 3.63 | 8.0 CaO. |
| Residue | 100.00 | 0.015 | 10.71 | 6.7 Mag. C. |

*Test 3.*—A comparison test was run in which the ore was ground and cyanided for a 24-hour period. The pulp was then filtered and washed and the pregnant solution (plus wash) and residue were submitted for assay. The results were:

| Product | Per Cent Wt. | Assay, Oz. Au/Ton | Per Cent Distrib. of Au | Reagent Consumption, Lbs./Ton |
|---|---|---|---|---|
| Calc. Head | 100.00 | 0.145 | 100.00 | |
| Preg. Solution and Wash | 231.67 | 0.0548 | 87.58 | 0.58 NaCN. 9.6 CaO. |
| Residue | 100.00 | 0.018 | 12.42 | |

*Test 4.*—A test charge of ore was ground, thickened and the magnetic portion was removed. The pulp was transferred to a wide-mouth agitating bottle at 37% solids, and was agitated for 48 hours with lime, cyanide and magnetic charcoal prepared from −48 +200 mesh black walnut shell charcoal, magnetite and sodium silicate in the weight proportions after drying of 59% carbon, 35% magnetite and 6% sodium silicate.

After 48 hours contact, the magnetic charcoal was recovered magnetically and the pulp was filtered and washed. The various products were submitted for assay. The results appear below.

| Product | Per Cent Wt. | Assay, Oz. Au/Ton | Per Cent Distrib. of Au | Reagent Consumption, Lbs./Ton |
|---|---|---|---|---|
| Calc. Head | 100.00 | 0.142 | 100.00 | |
| Mag. Conc. | 0.54 | 22.635 | 85.89 | 0.43 NaCN. |
| Barren and Wash | 257.50 | 0.001 | 1.81 | 14.8 CaO. |
| Residue | 100.00 | 0.0175 | 12.30 | 9.0 Mag. C. |

*Test 5.*—A test charge of ore was ground with lime and was treated magnetically. The pulp then was transferred to an agitating bottle at 37% solids and additions were made of lime, cyanide and 6.0 lbs. of magnetic carbon prepared from −20 +200 mesh activated maple wood charcoal per ton of dry feed. The pulp was agitated for 18 hours and an addition of 3.0 lbs. of magnetic charcoal then was made. Following an additional 6 hours of contact, the carbon was recovered magnetically and the products were submitted for assay.

| Product | Percent Wt | Assay, Oz. Au/Ton | Percent Distrib. of Au | Reagent Consumption, Lbs./Ton |
|---|---|---|---|---|
| Calc. Head | 100.00 | 0.140 | 100.00 | |
| Mag. Conc. | 0.625 | 19.400 | 86.51 | 0.37 NaCN. |
| Barren Soln. and Wash | 279.17 | 0.0005 | 1.00 | 9.9 CaO. |
| Residue | 100.00 | 0.0175 | 12.49 | 9.0 Mag. C. |

The activated maple wood charcoal used was prepared as follows: 5 parts of −20 +200 mesh activated maple wood charcoal was treated with 2 parts of −200 mesh magnetite and 6 parts of 50% solution of 40° Bé sodium silicate. The preparation was dried and reactivation effected by heating for 4 minutes at 1600° F.

It will be noted from the above tests that the recovery of gold was but little below the theoretically recoverable values as established by Test 3. This latter test, of course, was carried out in the laboratory as the ore is not susceptible to practical filtration on a commercial scale. This test merely shows the theoretical maximum amount of gold recoverable by cyanidation.

Example 3

The ore of Example 1 was used but the procedure was varied in that the pulp density was 42% solids and the magnetic carbon was added with the cyanide and lime during dissolution. The magnetic carbon used was prepared from maple wood charcoal as follows:

Parts
- −10 +100 mesh activated maple wood charcoal _____ 5
- −200 mesh magnetite _____ 3
- 40° Bé sodium silicate _____ 4
- Water _____ 3 and was calculated to contain, after activation, 55% carbon, 33% magnetite and 12% sodium silicate.

The results of the test were as follows:

| Product | Per Cent Wt. | Assay, Oz. Au/Ton | Per Cent Distrib. of Au | Reagent Consumption, Lbs./Ton |
|---|---|---|---|---|
| Calc. Head | 100.00 | 0.216 | 100.00 | |
| Mag. Conc. | 0.67 | 27.676 | 85.88 | 0.25 NaCN. |
| Barren and Wash | 245.00 | 0.0051 | 5.78 | 17.3 CaO. |
| Residue | 100.00 | 0.018 | 8.34 | 11.7 Mag. C. |

It will be noted that the loss in barren solution and wash, although small, is slightly in excess of that obtained by the procedure of Example 1. This could readily be reduced by counter-flow of the carbon.

Example 4

The procedure of Example 3 was followed except that the pulp density was 40% solids and the magnetic carbon was prepared from −20 +48 mesh activated peach pit carbon, sodium silicate and −325 mesh ferrosilicon. The composition of the magnetic carbon after drying and activation was 64% carbon, 27% ferrosilicon and 9% sodium silicate. The metallurgical results are shown in the following table:

| Product | Per Cent Wt. | Assay, Oz. Au/Ton | Per Cent Distrib. of Au | Reagent Consumption, Lbs./Ton |
|---|---|---|---|---|
| Calc. Head | 100.00 | 0.215 | 100.00 | |
| Mag. Conc. | 0.61 | 29.365 | 83.46 | 0.43 NaCN. |
| Barren Soln. and Wash | 275.00 | 0.0020 | 2.56 | 17.5 CaO. |
| Residue | 100.00 | 0.030 | 13.98 | 11.0 Mag. C. |

Example 5

The procedure of Example 4 was followed except that in the preparation of the magnetic carbon, very fine magnetic black iron oxide was used, which is a by-product from the manufacture of aniline. This product has particle size of approximately 5 microns or less. The composition was approximately 62% carbon, 25% black iron oxide and 13% sodium silicate. The quantity used likewise differed slightly from that of Example 4, 12 lbs. per ton being used instead of 11.7 lbs. The metallurgical results appear in the following table:

| Product | Per Cent Wt. | Assay, Oz. Au/Ton | Per Cent Distrib. of Au | Reagent Consumption, Lbs./Ton |
|---|---|---|---|---|
| Calc. Head | 100.00 | 0.235 | 100.00 | |
| Mag. Conc. | 0.67 | 31.646 | 89.71 | 0.50 NaCN. |
| Barren Soln. and Wash | 233.33 | 0.004 | 3.95 | 17.8 CaO. |
| Residue | 100.00 | 0.015 | 6.34 | 12.0 Mag. C. |

Example 6

A slimy low grade gold-silver ore from Nevada having the following composition:

Gold _____ oz. Au/ton__ 0.060
Silver _____ oz. Ag/ton__ 2.2
Sulfur _____ per cent S__ 0.18
Iron _____ per cent Fe__ 2.74 and containing principally quartz, sericite and iron oxides plus minor amounts of pyrite and chalcopyrite, was used for a series of tests with various amounts of cyanide and magnetic carbon.

*Test 1.*—A test charge of ore was ground with lime, thickened, magnetically separated and then transferred to a wide-mouth agitating bottle. At a pulp density of 40% solids, technical calcium cyanide and lime were added and a 24-hour dissolution period was allowed. Subsequently 9.3 lbs. of magnetic carbon (prepared from activated peach pit carbon, magnetite and sodium silicate in the weight proportions after activation of 60%, 30% and 10%, respectively) were added and a 24 hour time of contact for precipitation was allowed. The pulp then was treated magnetically and was filtered and washed. The results of the test were:

| Product | Per Cent Wt. | Assay, Oz. per Ton | | Per Cent Distrib. | | Reagent Consumption, Lbs./Ton |
|---|---|---|---|---|---|---|
| | | Ag | Au | Ag | Au | |
| Calc. Head | 100.00 | 2.17 | 0.057 | 100.00 | 100.00 | |
| Mag. Conc | 0.67 | 158.25 | 5.760 | 48.48 | 67.41 | 0.80 NaCN. |
| Barren and Wash | 281.67 | 0.117 | 0.0013 | 15.19 | 6.39 | 11.7 CaO. |
| Residue | 100.00 | 0.78 | 0.015 | 35.95 | 26.20 | 9.3 Mag. C. |

*Test 2.*—A comparison test was run similar to Test 1 except that no precipitant was used and after dissolution the pulp was filtered and washed. The residue and the combined filtrate plus wash water were submitted for assay.

| Product | Per Cent Wt. | Assay, Oz. per Ton | | Per Cent Distrib. | | Reagent Consumption, Lbs./Ton |
|---|---|---|---|---|---|---|
| | | Ag | Au | Ag | Au | |
| Calc. Head | 100.00 | 2.10 | 0.070 | 100.00 | 100.00 | |
| Preg. Soln. and Wash. | 300.42 | 0.462 | 0.0183 | 66.09 | 78.57 | 0.40 NaCN. 7.6 CaO. |
| Residue | 100.00 | 0.71 | 0.015 | 33.91 | 21.43 | |

*Test 3.*—The procedure of Test 1 was followed except that a stronger cyanide solution and more lime were used. The results were:

| Product | Per Cent Wt. | Assay, Oz. per Ton | | Per Cent Distrib. | | Reagent Consumption, Lbs./Ton |
|---|---|---|---|---|---|---|
| | | Ag | Au | Ag | Au | |
| Calc. Head | 100.00 | 2.17 | 0.060 | 100.00 | 100.00 | |
| Mag. Conc | 0.59 | 172.04 | 7.477 | 46.76 | 74.57 | 0.67 NaCN. |
| Barren and Wash. | 270.83 | 0.268 | 0.0026 | 33.43 | 11.90 | 13.8 CaO. |
| Residue | 100.00 | 0.43 | 0.008 | 19.81 | 13.53 | 9.3 Mag. C. |

*Test 4.*—This test was similar to Test 3 except that the quantity of magnetic carbon was increased to 16.7 lbs. per ton of dry feed. All other conditions were the same as in Test 3. The results were:

| Product | Per Cent Wt. | Assay, Oz. per Ton | | Per Cent Distrib. | | Reagent Consumption, Lbs./Ton |
|---|---|---|---|---|---|---|
| | | Ag | Au | Ag | Au | |
| Calc. Head | 100.00 | 2.05 | 0.067 | 100.00 | 100.00 | |
| Mag. Conc | 0.92 | 126.02 | 4.625 | 56.47 | 87.28 | 0.64 NaCN. |
| Barren and Wash. | 255.00 | 0.189 | 0.00137 | 23.56 | 5.23 | 14.1 CaO. |
| Residue | 100.00 | 0.41 | 0.005 | 19.97 | 7.49 | 16.7 Mag. C. |

*Example 7*

A series of tests with various magnetic carbons and a comparison test using the ordinary flotation method of removing carbon were carried out on a low grade Montana gold ore containing principally quartz and pyrite, with various iron oxides, micas and clay. The ore assayed as follows:

Gold _____ oz. Au/ton__ 0.130
Iron _____ % Fe___ 4.53
Sulfur _____ % S___ 2.78
Insoluble _____ % Insol__ 85.19

The ore ground to the following size:

| Mesh | Percent Wt. |
|---|---|
| +65 | 0.75 |
| +100 | 5.01 |
| +156 | 10.61 |
| +200 | 13.28 |
| −200 | 70.35 |
| Total | 100.00 |

Pulps of this ore are extremely slow settling and filter with such difficulty that they cannot be handled by ordinary cyanidation on a commercial scale.

*Test 1—Comparison test.*—A test charge of the ore was ground with hydrated lime and cyanide and then was transferred to an agitating bottle. At pulp density of 34% solids, the pump was agitated for a 48 hour period after which it was filtered and the residue was washed. The products were submitted for assay.

| Product | Percent Wt. | Assay, Oz. Au/Ton | Percent Distrib. of Au | Reagent Consumption, Lbs./Ton |
|---|---|---|---|---|
| Calc. Head | 100.00 | 0.128 | 100.00 | |
| Preg. Soln. and Wash. | 275.97 | 0.0408 | 88.24 | 1.69 NaCN. |
| Residue | 100.00 | 0.015 | 11.76 | 20.9 CaO. |

*Test 2—Magnetic charcoal test.*—The procedure of Test 1 was followed exactly except that 8.3 lbs. per ton of dry feed of activated peach pit carbon prepared as described in Example 1 was added at the start of agitation. After the 48 hours of dissolution and precipitation the carbon was separated magnetically and was cleaned once. The pulp was then filtered on a laboratory filter and washed. The results were as follows:

| Product | Percent Wt. | Assay, Oz. Au/Ton | Percent Distrib. of Au | Reagent Consumption, Lbs./Ton |
|---|---|---|---|---|
| Calc. Head | 100.00 | 0.131 | 100.00 | |
| Mag. Conc | 0.46 | 23.794 | 83.38 | 1.66 NaCN. |
| Barren Soln. and Wash. | 296.12 | 0.0023 | 5.19 | 20.9 CaO. |
| Residue | 100.00 | 0.015 | 11.43 | 8.3 Mag. C. |

*Test 3—Magnetic charcoal test.*—The procedure of Test 2 was followed but instead of the peach pit charcoal, 8 lbs./ton of a magnetic pine wood charcoal was used. This charcoal was prepared from 6 parts of −10 +200 mesh pine wood charcoal, 3 parts of −200 mesh magnetite, 8 parts of 40° Bé. sodium silicate and 4 parts of water. After the preparation, drying and activation which proceeded as described in the foregoing examples, the product was calculated to contain 50% carbon, 25% magnetite and 25% sodium silicate. Metallurgical results were as follows:

| Product | Per Cent Wt. | Assay, Oz. Au/ton | Per Cent Distrib. of Au | Reagent Consumption, Lbs./Ton |
|---|---|---|---|---|
| Calc. Head | 100.00 | 0.128 | 100.00 | |
| Mag. Conc | 0.41 | 25.570 | 81.78 | 1.53 NaCN. |
| Barren Soln. and Wash. | 336.44 | 0.0010 | 2.62 | 20.9 CaO. |
| Residue | 100.00 | 0.020 | 15.60 | 8.0 Mag. C. |

*Test 4—Comparison test, cyanidation, precipitation and flotation.*—In a test similar to Test 1, a charge of ore was agitated for 48 hours, following which ordinary activated pine charcoal, crushed to −150 mesh, was added in the amount of 5.0 lbs. per ton of dry feed. The pulp was agitated for an additional 30 minutes after which it was transferred to a mechanical flotation machine of the Fagergren type. The carbon was recovered by flotation for a period of 12 minutes, stage-adding fuel oil No. 2 and a frother which contained 60% alcohols from 7 to 10 carbon atoms and 40% saturated hydrocarbons. The flotation tailing was filtered and washed and the flotation concentrate was filtered and dried. All products were assayed. The results were as shown below:

| Product | Per Cent Wt. | Assay, Oz. Au/Ton | Per Cent Distrib. of Au | Reagent Consumption, Lbs./Ton |
|---|---|---|---|---|
| Calc. Head | 100.00 | 0.127 | 100.00 | 2.3 NaCN. |
| Flot. Concen | 1.57 | 6.978 | 86.33 | 20.0 CaO. |
| Flot. Tailing | 98.43 | 0.015 | 11.69 | 5.0 Charcoal. |
| Tailing Soln | 433.33 | 0.0006 | 1.98 | 0.54 Fuel Oil. 0.12 Frother. |

*Example 8*

A low-grade clayey ore from Nicaragua was used for a series of tests. The ore assayed as follows:

Gold _____ oz. Au/ton__ 0.120
Silver _____ oz. Ag/ton__ 0.40

The ore was composed chiefly of quartz, clay and feldspar. Considerable limonite was present and some hematite occurred but the sulfide content was very low. Pulps of the ore were extremely viscous and were difficult to settle and filter.

*Test 1.*—A test charge of ore was ground to 4.4% +48 mesh and 58.2% —200 mesh, and was transferred to wide-mouth agitating bottle. The pulp was preaerated with lime for a period of 2 hours, then cyanide, technical calcium cyanide, and additional lime were added and the pulp was agitated for 24 hours at 33% solids. After agitation, the pulp was filtered and washed. The filtrate and residue were submitted for assay. The results were as follows:

| Product | Per cent Weight | Assay, Oz. Au/ton | Per cent Distrib. of Au | Reagent Consumption, Lbs./Ton |
|---|---|---|---|---|
| Calc. Head | 100.00 | 0.125 | 100.00 | 0.10 NaCN. |
| Preg. Soln. and Wash. | 256.67 | 0.0448 | 92.01 | |
| Residue | 100.00 | 0.010 | 7.99 | 20.9 CaO. |

*Test 2.*—This test was similar to Test 1 except that after 17 hours of agitation 13.3 lbs./ton of a magnetic charcoal was added, prepared from 25 parts of —20 +200 mesh peach pit charcoal, 10 parts —200 mesh magnetite, 15 parts of 40° Bé sodium silicate and 10 parts of water. After drying and activation, as described in the foregoing examples, the carbon was calculated to have 65% carbon, 26% magnetite and 9% sodium silicate. The charcoal remained in contact with the pulp for 7 hours and was then recovered magnetically. The pulp was filtered on a laboratory filter, washed, and the products assayed. The metallurgical results are as follows:

| Product | Assay, Oz./Ton | | Per cent Distrib. | | Consumption Lbs./Ton |
|---|---|---|---|---|---|
| | Ag | Au | Ag | Au | |
| Calc. Head | 100.00 | 0.408 | 0.125 | 100.00 | 100.00 | |
| Mag. Conc | 0.73 | 46.21 | 14.317 | 82.70 | 83.75 | 0.10 NaCN. |
| Barren Soln. and Wash. | 302.50 | 0.0068 | 0.0034 | 5.04 | 8.24 | 19.2 CaO. |
| Residue | 100.00 | 0.050 | 0.010 | 12.26 | 8.01 | 13.3 Mag. C. |

*Test 3.*—This test was a straight froth flotation test. The ore was ground as in Tests 1 and 2 and the pulp was transferred to a flotation machine and was floated using a higher xanthate, a sodium salt of a dialkyldithiophosphate and a higher alcohol-type frother. Under optimum flotation conditions, only 57.6% of the gold was recovered in a product assaying 1.64 oz. per ton and representing 4.83% of the total weight of feed. It will be noted that the magnetic process recovered about 50% more gold in a much higher grade concentrate.

*Example 9*

The ore of Example 2 was used in a test to determine the effect of a counter-current flow of magnetic carbon. This was a locked test.

Three test charges of ore were treated. The grinding, magnetic separation and thickening were conducted as described in Test 1 of Example 2.

The first charge of pulp, at a pulp density of 37% solids, was agitated for 20 hours with lime, technical calcium cyanide and 9.0 lbs. of the magnetic charcoal used in Test 5 of Example 2. After 20 hours contact the magnetic charcoal was recovered and was submitted for assay. To the pulp then were added 9.0 lbs. of fresh magnetic charcoal per ton of feed and an additional 4 hours of contact were allowed, after which the magnetic concentrate was removed and was added to the second charge of pulp, simulating counter-current flow of fresh carbon. The second charge of pulp was treated exactly as described above and the same procedure was followed in treating the third charge. After removal of the second magnetic concentrate from the third charge, the concentrate was designated as the "circulating carbon" and was submitted for assay.

The metallurgical results when compared with those of Example 2 show that a counter-current flow of the carbon produced a higher recovery of gold, the solution losses being very markedly reduced. The low grade of the concentrate from charge No. 1 was due to incomplete removal of naturally-occurring magnetic material before cyanidation.

| Charge No. | Product | Per Cent Wt. | Assay, Oz. Au/ton | Per Cent Distrib. of Au | Reagent Consumption, Lbs./Ton |
|---|---|---|---|---|---|
| 1 | Calc. Head | 100.00 | 0.138 | 100.00 | |
| | Mag. Conc | 0.74 | 16.582 | 88.61 | 0.35 NaCN. |
| | Barren Soln. and Wash. | 311.67 | 0.00025 | 0.56 | 9.5 CaO. |
| | Residue | 100.00 | 0.015 | 10.83 | 9.0 Mag. C. |
| 2 | Calc. Head | 100.00 | 0.145 | 100.00 | |
| | Mag. Conc | 0.60 | 20.822 | 86.37 | 0.30 NaCN. |
| | Barren Soln. and Wash. | 341.67 | 0.0005 | 1.18 | 10.0 CaO. |
| | Residue | 100.00 | 0.018 | 12.45 | 9.0 Mag. C. |
| 3 | Calc. Head | 100.00 | 0.141 | 100.00 | |
| | Mag. Conc | 0.55 | 22.582 | 88.25 | 0.30 NaCN. |
| | Barren Soln. and Wash. | 360.00 | 0.00015 | 0.38 | 10.0 CaO. |
| | Residue | 100.00 | 0.016 | 11.37 | 9.0 Mag. C. |
| | (Circul. Carbon) | 0.51 | 0.477 | (1.73) | |

The present invention is of primary importance in the beneficiation of slimy precious metal ores. The process, of course, works perfectly with ores which are not slimy and which are susceptible to the ordinary cyanidation procedures. In some cases the present invention is of great economic importance even with ores which can be handled technically by other cyanidation procedure. The capital investment of a plant in which the process of the present invention is used is very much smaller than a conventional cyanidation plant with its large filters or decantation tanks. Therefore, when small ore bodies, such as old tailings, piles, and the like are to be treated, the reduced capital expenditure makes the present process economically feasible where the ordinary cyanidation procedures with their large capital investment could not be used economically. In a broader aspect, therefore, the present invention may be used with ores which can be treated effectively by other cyanidation processes. The preferred modification, however, in which slimy ores are treated constitutes by far the most important practical field of utilization.

We claim:

1. A process of recovering precious metals selected from the group consisting of gold and silver from ores which comprises subjecting the ore to cyanidation, precipitating precious metals by means of activated carbon containing sufficient magnetic material to render the carbon particles magnetic, separating the magnetic precious metal-bearing carbon magnetically.

2. A process of recovering precious metals selected from the group consisting of gold and silver from ores containing the same and associated with magnetic gangue which comprises subjecting the ore to magnetic separation to remove the magnetic gangue therefrom as a magnetic concentrate, cyaniding the magnetic tailing, precipitating the precious metals therefrom by means of activated carbon containing sufficient magnetic material to render the carbon particles magnetic, separating the magnetic precious metal-bearing carbon magnetically.

3. A process of recovering precious metals selected from the group consisting of gold and silver from slimy ores which comprises subjecting the ore to cyanidation, precipitating precious metals by means of activated carbon containing sufficient magnetic material to render the carbon particles magnetic, separating the magnetic precious metal-bearing carbon magnetically.

4. A process of recovering precious metals selected from the group consisting of gold and silver from slimy ores containing the same and associated with magnetic gangue which comprises subjecting the ore to magnetic separation to remove the magnetic gangue therefrom as a magntic concentrate, cyaniding the magnetic tailing, precipitating the precious metals therefrom by means of activated carbon containing sufficient magnetic material to render the carbon particles magnetic, separating the magnetic precious metal-bearing carbon magnetically.

5. A process of recovering gold from slimy ores which comprises subjecting the ore to cyanidation, precipitating the gold by means of activated carbon containing sufficient magnetic material to render the carbon particles magnetic, separating the magnetic gold-bearing carbon magnetically.

6. A process of recovering gold from slimy ores containing the same and associated with magnetic gangue which comprises subjecting the ore to magnetic separation to remove the magnetic gangue therefrom as a magnetic concentrate, cyaniding the magnetic tailing, precipitating the gold therefrom by means of activated carbon containing sufficient magnetic material to render the carbon particles magnetic, separating the magnetic gold-bearing carbon magnetically.

EARL C. HERKENHOFF.
NORMAN HEDLEY.

REFERENCES CITED

The following references are of record in the file of this patent:

UNITED STATES PATENTS

| Number | Name | Date |
| --- | --- | --- |
| 1,043,850 | Lockwood | Nov. 12, 1912 |
| 1,572,425 | Fisher | Feb. 9, 1926 |
| 1,789,507 | Aarts | Jan. 20, 1931 |
| 2,315,187 | Chapman | Mar. 30, 1943 |